(12) United States Patent
Aguilar-Mendoza et al.

(10) Patent No.: US 9,535,192 B2
(45) Date of Patent: Jan. 3, 2017

(54) METHOD OF MAKING WAVEGUIDE-LIKE STRUCTURES

(71) Applicant: The Regents of the University of California, Oakland, CA (US)

(72) Inventors: Guillermo Aguilar-Mendoza, Corona, CA (US); Javier E. Garay, Riverside, CA (US); Santiago Camacho-Lopez, Ensenada Baja California (MX)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/491,284

(22) Filed: Sep. 19, 2014

(65) Prior Publication Data

US 2015/0231594 A1    Aug. 20, 2015

Related U.S. Application Data

(60) Provisional application No. 61/879,930, filed on Sep. 19, 2013.

(51) Int. Cl.
*B01J 19/12* (2006.01)
*G02B 6/10* (2006.01)
*G02B 1/12* (2006.01)
*G02B 6/13* (2006.01)

(52) U.S. Cl.
CPC .. *G02B 1/12* (2013.01); *G02B 6/13* (2013.01)

(58) Field of Classification Search
CPC ................................. G02B 6/13; G02B 1/12
USPC .................................. 385/14–47; 372/92–97
See application file for complete search history.

(56) References Cited

U.S. PATENT DOCUMENTS

| | | | |
|---|---|---|---|
| 6,097,870 A * | 8/2000 | Ranka | G02B 6/02004 385/122 |
| 2005/0265405 A1* | 12/2005 | Mannstadt | G02F 1/365 372/30 |
| 2010/0167170 A1* | 7/2010 | Narendar | B82Y 30/00 429/495 |

* cited by examiner

*Primary Examiner* — Akm Enayet Ullah
(74) *Attorney, Agent, or Firm* — Joseph R. Baker, Jr.; Gavrilovich, Dodd & Lindsey LLP

(57) ABSTRACT

The disclosure provides for writing or introducing waveguide-like structures in transparent polycrystalline ceramics using femtosecond laser pulses. The disclosure further provides for tuning the demarcation of the waveguide-like structures by varying the number of incident pulses per unit area.

3 Claims, 3 Drawing Sheets

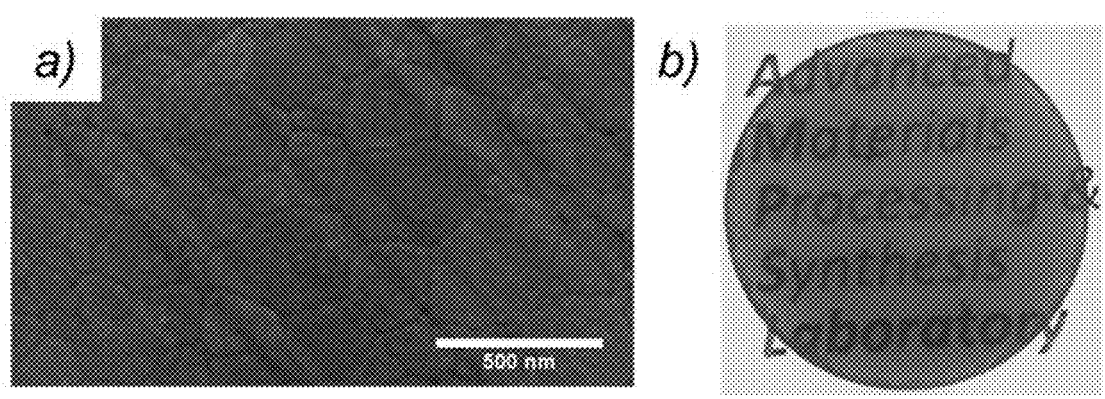
FIGURE 1A-B
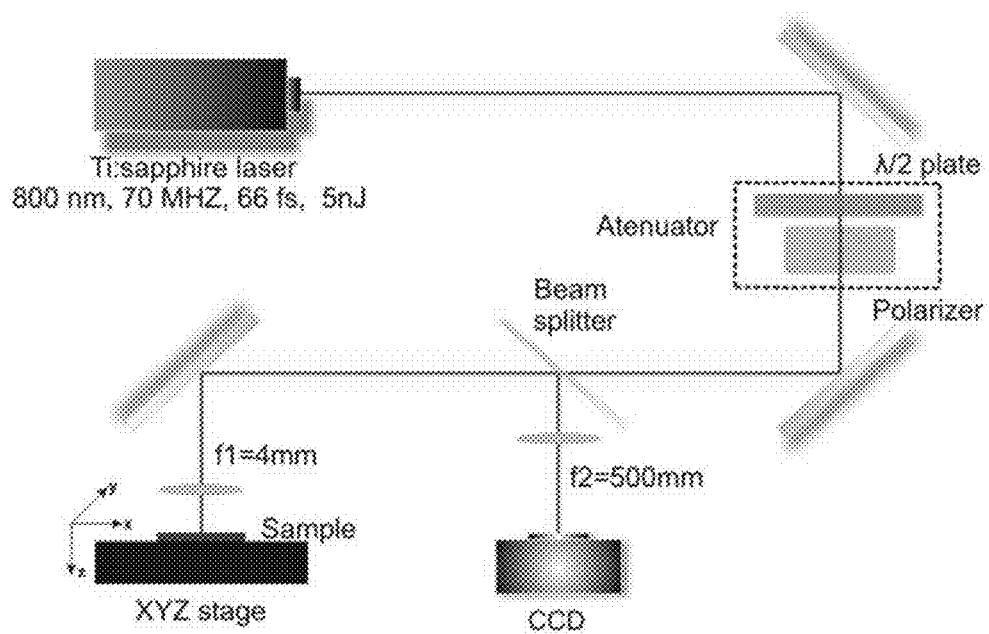
FIGURE 2

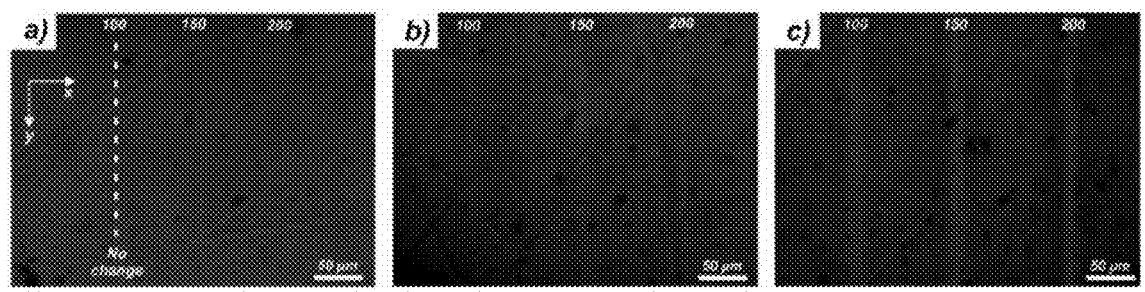
FIGURE 3A-C
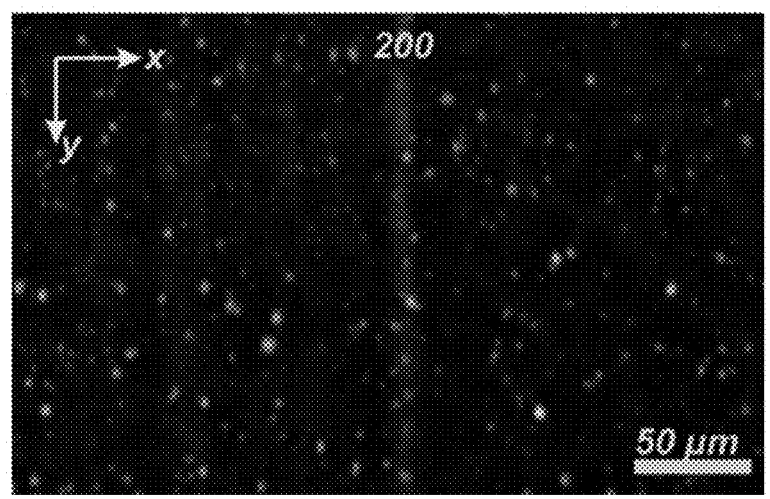
FIGURE 4

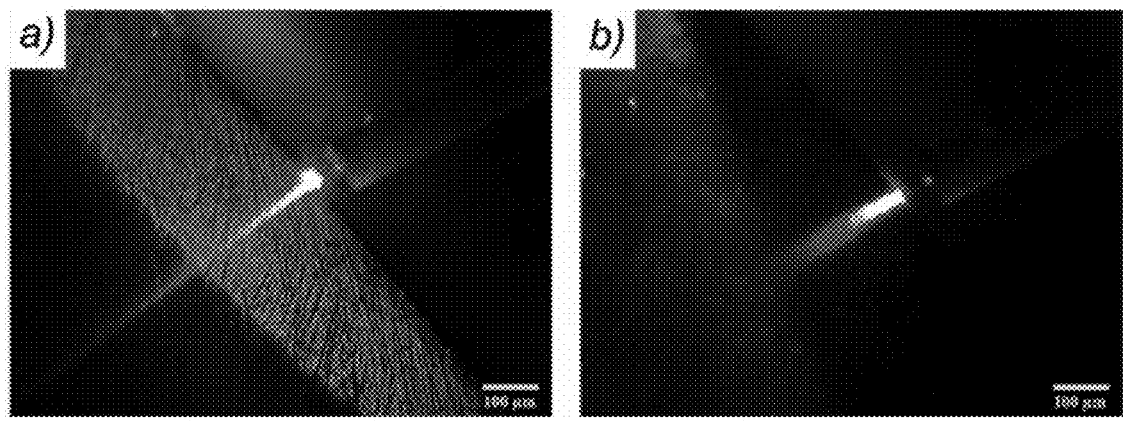
FIGURE 5A-B
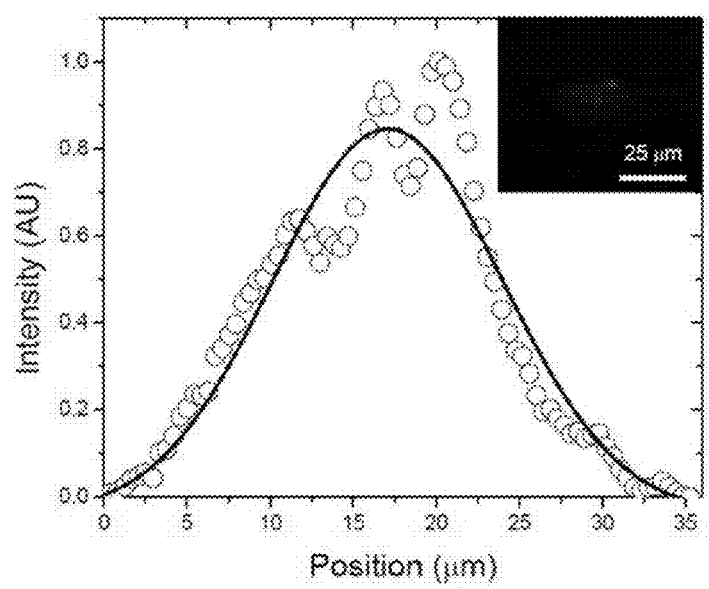
FIGURE 6

… (1)

METHOD OF MAKING WAVEGUIDE-LIKE STRUCTURES

CROSS REFERENCE TO RELATED APPLICATIONS

This application claims priority under 35 U.S.C. §119 from Provisional Application Ser. No. 61/879,930, filed Sep. 19, 2013, the disclosure of which is incorporated herein by reference.

TECHNICAL FIELD

The disclosure provides for writing waveguide-like structures in transparent polycrystalline ceramics using an ultra-low fluence femtosecond laser.

BACKGROUND

While ceramics offer high temperature, chemical stability and relatively efficient fabrication compared to glasses and single crystals, a drawback to the widespread application of waveguide structures in ceramic-based devices is the relatively high power that is necessary to induce permanent optical changes in ceramics.

SUMMARY

The disclosure provides for a process to introduce waveguide-like structures into transparent polycrystalline ceramic materials using femtosecond laser pulses of a few nJ.

As will be further described herein, irradiation using fs laser pulses caused permanent changes in the optical properties of transparent polycrystalline ceramics in the irradiated zone. The laser written structures were found to confine He—Ne laser light (632 nm) thereby introducing waveguide-like structures into the ceramic material. Moreover, waveguide-like structures can be written into transparent ceramic materials, such as YSZ ceramics, using remarkably low per-pulse energy (5 nJ). The number of passes with the laser (i.e., total incident pulses per unit area) was found to affect the waveguide writing. The waveguide-like structures are most likely the result of regions where the concentration of oxygen vacancies and/or their associated free electrons have been altered by laser irradiation.

The disclosure therefore provides for novel and innovative methods for writing waveguide-like structures into transparent polycrystalline ceramic materials at a power substantially lower than previously thought feasible.

In a particular embodiment, the disclosure provides for a method to write waveguide-like structures in a transparent ceramic material, such as YSZ, comprising: processing a transparent ceramic material using femtosecond laser pulses with a per-pulse energy between 1 nJ to 8 nJ. In another embodiment, the transparent ceramic material is fabricated by using a current activated pressure assisted densification (CAPAD) process. In yet another embodiment, the transparent ceramic material is not annealed prior to processing with femtosecond laser pulses. In an alternate embodiment, the transparent ceramic material is annealed at 750° C. in the presence of air for 1 to 15 minutes prior to processing with femtosecond laser pulses. In a further embodiment, the femtosecond laser pulses have a per-pulse energy of no greater than 5 nJ. In another embodiment, at least 100 incident femtosecond laser pulses per unit area are used to process the transparent ceramic material. In an alternate embodiment, between 150 to 250 incident femtosecond laser pulses per unit area are used to process the transparent ceramic material. In a further embodiment, the same per-pulse energy, such as 5 nJ, is used for all of the incident femtosecond laser pulses.

In a certain embodiment, the disclosure provides for a transparent ceramic material comprising one or more waveguide-like structures made by a method disclosed herein.

DESCRIPTION OF DRAWINGS

FIG. 1A-B provides for (A) SEM micrograph of the thermally etched surface of an 8YSZ sample produced via CAPAD at 1200° C. with a 10 min hold time at the temperature, 106 MPa; and (B) photograph of the same 8YSZ on top of backlit text showing transparency of the ceramic.

FIG. 2 provides a schematic of a laser processing set-up to write the waveguide-like structures in transparent ceramic materials.

FIG. 3A-C provides optical micrographs (in transmission) of the waveguide-like structures written in the YSZ ceramic using varying energies: (A) 3.6 nJ per pulse; (B) 4.6 nJ per pulse; and (C) 5 nJ per pulse. The inset number indicates the number of scans along the same track.

FIG. 4 presents a phase contrast micrograph of a waveguide-like structure written at 5 nJ and 200 scans.

FIG. 5A-B provides optical micrographs of waveguide-fiber coupling into a not-annealed sample. (A) Light confinement in a waveguide-like structure written at 5 nJ and 200 scans. (B) Coupling light in a zone out of the waveguide-like structure.

FIG. 6 presents an intensity profile at the output face of the waveguide-like structure for a transmitted beam of a wavelength of 632 nm. The intensity distribution of the waveguide presents two bright spots which could indicate two propagation modes of the waveguide (Inset).

DETAILED DESCRIPTION

As used herein and in the appended claims, the singular forms "a," "and," and "the" include plural referents unless the context clearly dictates otherwise. Thus, for example, reference to "a waveguide" includes a plurality of such components and reference to "the transparent ceramic material" includes reference to one or more transparent ceramic materials and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art. Although many methods and reagents similar or equivalent to those described herein, the exemplary methods and materials are presented herein.

All publications mentioned herein are incorporated herein by reference in full for the purpose of describing and disclosing the methodologies, which might be used in connection with the description herein. Moreover, with respect to any term that is presented in one or more publications that is similar to, or identical with, a term that has been expressly defined in this disclosure, the definition of the term as expressly provided in this disclosure will control in all respects.

Waveguides in optical media are an essential part of a wide variety of important optical devices. In recent years, pulsed laser processing has become an established method for writing waveguides in optical materials; successful examples using femtosecond (fs) laser pulses exist for glasses and single crystals. In recent years transparent polycrystalline ceramics have been receiving significantly increased attention for optical applications such as laser source materials, solid state lighting and light manipulation. Ceramics offer high temperature and chemical stability and relatively efficient fabrication compared to glasses and single crystals thus promising to increase the application space for optical materials.

A potential drawback to the widespread application of waveguide structures in ceramic-based devices is the relatively high power that is necessary to induce permanent optical changes in ceramics (i.e., for waveguide writing). Herein we present a method for writing waveguides in transparent polycrystalline ceramics using fs laser pulses with remarkably low energy. The low energy requirements for writing waveguides should make these optical ceramics more amenable to industrial application and lead to their integration in devices.

In the experiments presented herein, by using ultralow energy (e.g., ≤5 nJ) and ultrafast (e.g., ≥66 fs) laser pulses waveguide-like structures were introduced into transparent polycrystalline ceramic materials. The energy level of the laser pulses used in writing these waveguide-like structures is at least three or four orders of magnitude lower than previously reported for ceramics, and are the lowest energies ever reported for the successful writing of waveguides in a ceramic material. Further, it was found that the refractive index change increases with the pulse energy and the number of scans. Moreover, it was also found that the writing of these structures is easier for samples with a low annealing time (high linear absorption coefficient).

The disclosure also provides for making transparent polycrystalline ceramic materials disclosed herein. In a particular embodiment, the transparent ceramic materials can be manufactured by utilizing one or more current-activated powder-assisted densification (CAPAD) process steps. The CAPAD process for making the transparent polycrystalline ceramic materials includes the step of densifying and annealing the ceramic materials, such as nanometric powders, with little grain growth, wherein the synergistic combination of very high density and nanoscale sized crystals makes a transparent material. Typically, the transparent ceramic materials are produced from nanometric powders with narrow-size distribution. In a further embodiment, the CAPAD process is used to densify ceramic powders having powder grain sizes of less than 100 nm, less than 90 nm, less than 80 nm, less than 70 nm, less than 60 nm, less than 55 nm, less than 50 nm, less than 45 nm, less than 40 nm, or less than 35 nm. In yet a further embodiment, the CAPAD process is used to densify ceramic Yttria stabilized cubic zirconia (YSZ) powders having powder grain sizes of less than 100 nm, less than 90 nm, less than 80 nm, less than 70 nm, less than 60 nm, less than 55 nm, less than 50 nm, less than 45 nm, less than 40 nm, or less than 35 nm.

As the transmission of light through a sample is related to the average concentration of oxygen vacancies, there is an increase in transmission when the samples are annealed for various times in the presence of oxygen (e.g., air) at an elevated temperature (e.g., 750° C.). In a particular embodiment, the transparent ceramic material is annealed at an elevated temperature in the presence of oxygen for at least 1, 2, 3, 4, 5, 6, 7, 8, 9, 10, 11, 12, 13, 14, 15, 20, 30, 40, 60, 90, 120, 180, 240, 360, or 480 minutes. In a further embodiment, the transparent ceramic material is annealed at an elevated temperature (e.g., 750° C.) in the presence of oxygen (e.g., air) for at least 1 to 15 minutes. In alternate embodiment, the transparent ceramic material is not annealed prior to processing with femtosecond laser pulses.

The disclosure further provides that the transparent polycrystalline ceramic materials may be customized to transmit certain wavelengths, by manufacturing the materials to have a certain color. In another embodiment, the ceramic materials disclosed herein may have a color between yellow and deep ruby red. In a further embodiment, the ceramic materials disclosed herein may be substantially clear or colorless.

In a further embodiment, a method for making the transparent polycrystalline ceramic materials of the disclosure comprises the step of consolidating the densified transparent material into a net shaped form. Examples of net shaped forms include but are not limited to, substantially circular, oval, rectangular, trapezoidal, polyhedral and square; and wherein the shaped form may be convex, concave or substantially planar. In a further embodiment, the net shaped forms have surfaces that are uniform in texture. In an alternate embodiment, the net shaped forms have surfaces that are not uniform in texture.

The disclosure provides for writing or introducing waveguide like structures into the transparent polycrystalline ceramic materials by using a pulsed laser process. In experiments presented herein, it was found that waveguide-like structures could be introduced into the transparent ceramic materials by using an unexpectedly low power laser, such as a femtosecond laser. In a particular embodiment, waveguide-like structures can be introduced/written into transparent polycrystalline ceramic materials by using femtosecond laser pulses having per-pulse energy between 1 nJ to 15 nJ, 1 nJ to 12 nJ, 1 nJ to 10 nJ, 1 nJ to 8 nJ, 1 nJ to 7 nJ, 1 to 6 nJ, 1 to 5 nJ, 2 to 4 nJ. In another embodiment, waveguide-like structures can be introduced/written into transparent polycrystalline ceramic materials by using femtosecond laser pulses having per-pulse energy of about 3 nJ, 3.1 nJ, 3.2 nJ, 3.3 nJ, 3.4 nJ, 3.5 nJ, 3.6 nJ, 3.7 nJ, 3.8 nJ, 3.9 nJ, 4 nJ, 4.1 nJ, 4.2 nJ, 4.3 nJ, 4.4 nJ, 4.5 nJ, 4.6 nJ, 4.7 nJ, 4.8 nJ, 4.9 nJ, 5 nJ, 5.1 nJ, 5.2 nJ, 5.3 nJ, 5.4 nJ or 5.5 nJ. Moreover, in experiments presented herein it was also found that the number of incident pulses per unit area at each energy level played an unexpected role in shaping/demarking the waveguide like structures. In particular, it was found that no matter the per-pulse energy level, as the scan number increased the waveguide-like structural changes to the ceramic material became more and more apparent. Accordingly, the disclosure provides for fine tuning the demarcation of waveguide-like structures in transparent ceramic materials by varying the number of incident pulses per unit area. In a certain embodiment, waveguide-like structures can be introduced/written into transparent polycrystalline ceramic materials by using from 100 to 300, 110 to 280, 120 to 260, 130 to 240, 140 to 220, or 150 to 210 incident pulses per unit area. In a further embodiment, waveguide-like structures can be introduced/written into transparent polycrystalline ceramic materials by using about 100, 110, 120, 130, 140, 150, 160, 170, 180, 190, 200, 210, 220, 230, 240, or 250 incident pulses per unit area. It should be further understood that the foregoing embodiments directed to the incident pulses per unit area can be all be performed with the same per-pulse energy or alternatively where some pulses are performed at certain per-pulse energy while others are performed at different per-pulse energies.

The following examples are intended to illustrate but not limit the disclosure. While they are typical of those that might be used, other procedures known to those skilled in the art may alternatively be used.

EXAMPLES

Ceramic Fabrication.

Commercial (Tosoh Corporation, Tokyo, Japan) nanocrystalline 8YSZ powder with a reported grain size of 50 nm was densified using current activated pressure assisted densification (CAPAD). Each of the samples was prepared in a graphite die with 19 mm inner diameter. Temperature was measured using a grounded N-type thermocouple placed in a hole drilled halfway through the thickness of the die. The CAPAD processing was done in a custom built apparatus as described in Casolco et al. (*Script. Mater.* 58:516-519 (2008)). 8YSZ powder (1.5 g) was loaded into the die for each sample. The pressure in the system was raised to 106 MPa before the current was applied.

When this pressure was reached, the current heated the sample to 1200° C. using a heating rate of 200° C./min. Samples were held for 10 min at final pressure and temperature. The samples were mechanically polished for microstructural and optical characterization. The densified samples were fractured and examined using scanning electron microscopy (SEM) (Phillips FEI). A SEM micrograph and optical photograph of a typical sample is presented in FIG. 1. The sample was annealed for 8 hours in air at 750° C., in order to thermally etch the surface.

Ceramic Annealing.

The optical properties, such as absorption coefficient, are highly dependent on oxygen stoichiometry in 8YSZ. Oxygen stoichiometry in YSZ can be readily controlled by exposure to either reducing or oxidizing atmospheres. The as-processed ceramics presented herein are oxygenic deficient due to the reducing nature of CAPAD processing conditions. However, by annealing the YSZ samples in air, results in the diffusion of oxygen back into the sample and a reduction in the number and size of oxygen vacancies that were created via the high temperature heating. Thus, as the transmission of light through a sample is related to the average concentration of oxygen vacancies, there is an increase in transmission when the samples are annealed for various times. In order to evaluate the effects of annealing on waveguide writing, the samples were annealed in air at 750° C. or various times (10 min to 8 hrs).

Femtosecond Laser Processing.

When a femtosecond laser pulse is focused inside a transparent material the irradiance reached in the focal volume may induce nonlinear absorption through a combination of multiphoton absorption, avalanche ionization and tunneling ionization. If enough energy is deposited in the material through this nonlinear absorption, permanent structural changes such as refractive index changes can be induced. Since the nonlinear absorption can be only reached for high irradiances, the changes are induced only in the focal volume. Therefore, by simply translating the sample with respect to the focus and using a continuous train of pulses it is possible to induce permanent changes in the material in a reproducible and controlled manner. This technique was used to write waveguide-like structures into an YSZ ceramic material.

For the laser processing of the ceramics a homemade Ti:sapphire oscillator with a central wavelength of 800 nm, a repetition rate of 70 MHz, a maximum on-target per pulse energy of 5 nJ and pulse duration (FWHM) of about 66 fs was used. The laser beam was focused on the surface sample through a lens of 0.6 N.A. and a focal distance $f_1=4$ mm. To find and visualize the beam waist onto the sample ($\omega_0=1.9$ μm, $z_R=7.8$ μm) we used a lens of focal distance $f_2=500$ mm and a CCD camera (PL-A774, Pixelink). This system was set in a configuration similar to an image relay arrangement. The samples were translated with a constant speed of 530 μm/s and perpendicular to the incident beam (e.g., see schematic in FIG. 2). To determine the refractive index change threshold, a series of about 2 mm long lines were written varying the number of laser scans and the per pulse delivered energy by using an attenuator made of a combination a half-wave plate and a polarizer.

A top view optical micrograph of a series of waveguide-like structures on as processed YSZ is shown in FIG. 3. The micrographs reveal that with each of the laser energies in this study, pulsed laser processing produced written structures that are brighter compared to the surrounding material, indicating a permanent change in the optical properties of the irradiated region. This color change can be caused by a change in absorption coefficient, refractive index or both as will be discussed below.

The energies used for laser irradiation (3.6 nJ to 5 nJ) are at least three or four orders of magnitude lower than previously reported in the literature for laser-induced index trimming in transparent crystals and ceramics. The lowest (threshold energy) for writing is 3.6 nJ ($I=4.4\times10^{11}$ W/cm$^2$, $F=31$ mJ/cm$^2$). In order to verify that the energy was below the ablation threshold, the irradiated zones were imaged using a scanning electron microscope (SEM). There was no evidence of ablation.

The number of scans was also found to play an important role in waveguide writing at the energies tested. For example, at 3.6 nJ (see FIG. 3A) at a low number of scans (100) no visible change was observed, while increasing the number of scans to 150 produced a weak visible change, and at 200 scans the wave-guide structure is clearly visible. The effect of scans was similar at higher energies (see FIG. 3B-C). The dependence on the total number of pulses indicates that the total incident pulse per unit area is important aspect in forming the wave-guide structures.

Changes in the optical properties during fs processing are often attributed to laser-induced structural changes due to the heat accumulation and field or irradiance related effects over the irradiated zone. It was not expected, however, that such phase changes would occur in the samples tested, since fully stabilized YSZ has a cubic structure that is very stable. It was postulated that the observed changes in the materials are related to point defects. Previously, it was found YSZ could be induced to change color by changing the oxygen stoichiometry in the sample by annealing in the presence of oxygen. The primary absorption centers in YSZ are oxygen vacancies, $V_{\ddot{o}}$ with trapped electrons, e' producing oxygen vacancies with a single positive charge written in Kroger-Vink notation as:

$$V_{\ddot{o}}+e' \rightarrow V_{\dot{o}} \qquad (1)$$

By annealing in the presence of oxygen one can change the concentration of oxygen vacancies with trapped electrons, [$V_{\dot{o}}$]. The color change induced by fs laser processing induces a similar change (i.e. changes in the concentration of oxygen vacancies with single positive charge, [$V_o^{\cdot}$]). In addition to the color changes, the oxygen stoichiometry changes in YSZ can also affect the refractive index.

Equation (1) suggest that there are two possibilities for controlling [$V_{\ddot{o}}$]: (1) The concentration of [$V_{\ddot{o}}$] can vary or (2) the trapped electron can become de-coupled from the [$V_{\ddot{o}}$]. Both mechanisms are feasible with pulsed laser processing. Mechanism (1) requires thermally driven diffusion of oxygen vacancies. fs laser irradiation could increase the temperature of the samples to temperatures where oxygen vacancies have sufficient mobility to cause significant diffusion. This is feasible because of the time between successive delivered pulses (14 ns, i.e. 70 MHz repetition rate), which for this material, could be much shorter than the characteristic time for thermal diffusion out of the focal volume. As a result, the delivered train of laser pulses deposits energy faster than the time required for heat diffusion to occur, leading to a high temperature rise of the material over the focal region. For long enough laser exposures, the heat deposited by the successive pulses of the oscillator diffuses towards the surrounding material inducing changes beyond the focal volume. This can be seen in FIG. 3C, where the width of the structures is larger than the diameter of the laser spot ($\approx$4 μm). It is possible to reach high temperatures via heat accumulation processes by using a high-repetition rate femtosecond laser.

It is also possible that high electric field caused by the fs laser interaction with YSZ causes decoupling of electrons trapped in vacancies (Mechanism (2)). Two types of oxygen vacancies have been identified in reduced cubic YSZ: T- and C-Type oxygen vacancies. The T-type vacancies occur in weakly reducing conditions, while the C-Type occurs in strongly reducing atmospheres. The energy gaps between the T- and C-Type oxygen vacancies and the conduction band in reduced YSZ are ~3.3 eV and ~2.6 eV, respectively. As the samples are irradiated with λ=800 nm, corresponding to a photon energy of $E_{ph}$=1.55 eV, it is apparently not possible to induce changes in the YSZ via Mechanism 2 with linear photonic absorption. However, since fs-laser pulses are employed, the intensities are very high indicating the possibility of non-linear effects, in particular 2-photon absorption. The doublet of $E_{ph}$ is 3.10 eV which is enough energy to decouple trapped electrons from the C-type oxygen vacancies via Mechanism 2.

In order to determine whether the induced color change in the irradiated zones also led to a refractive index change, the post-laser processed ceramics were analyzed using a phase contrast microscope (Olympus, model BX41). FIG. 4 shows a phase contrast micrograph of a waveguide-like structure fabricated at 5 nJ per pulse energy (F=44 mJ/cm², I=6.7×10¹¹ W/cm²) and 200 scans. The micrograph reveals a high contrast between the resulting structure and the surrounding material. This clearly indicates a refractive index change over the irradiated track. The bright spots visible in sample are likely dust particles and/or other imperfections caused by polishing.

While the color change in YSZ has been associated with variance in the oxygen vacancy concentration, permittivity experiments showing that the refractive index is also coupled to the degree of oxygen reduction were performed. There is a clear inverse relation between the oxygen vacancy concentration and the relative permittivity in YSZ. Measurements were performed at significantly lower than optical frequencies (10³ Hz), but presumably similar changes could occur over a wide frequency range. Since the refractive index is related to the permittivity by:

$$n \propto \left(\frac{\varepsilon}{\varepsilon_o}\right)^{\frac{1}{2}} \quad (2)$$

where n is the refractive index, $\varepsilon$ and $\varepsilon_o$ are the relative and free space permittivities respectively, it also follows that there is an inverse relation between the oxygen vacancy concentration and the refractive index. This means that n should increase as $V_o$ decreases. Thus, it is postulated that the waveguide-like structures are caused by a change in fs-laser irradiation decreasing the oxygen vacancy concentration thereby increasing the refractive index.

The irradiation results for samples with different annealing times (i.e., different optical properties) are presented in TABLE 1. All the results were obtained for a per pulse energy of 5 nJ (F=44 mJ/cm², I=6.7×10¹¹ W/cm²) and 200 scans.

TABLE 1

Laser induced changes in the YSZ ceramic as a function of the annealing time.

| Annealing time | Transmittance (%) at 800 nm | Induced change |
| --- | --- | --- |
| Not annealed | 15 | Waveguide-like structure |
| 10 min hold | 14 | Waveguide-like structure |
| 15 min hold | 13 | No change induced |
| 30 min hold | 20 | No change induced |
| 45 min hold | 20 | No change induced |
| 1 hr hold | 28 | No change Induced |
| 8 hr hold | 38 | No change induced |

It was found that the waveguide-like structures writing is easier for samples with lower annealing times that have lower optical transmittance (higher linear absorption coefficient). This is further evidence that the waveguide writing process is an analogous effect to annealing (i.e., is dependent on the concentration of oxygen vacancies in the sample [$V_{\ddot{o}}$]).

The ability of the written structures to behave as an optical waveguide was proven by coupling a He—Ne laser through a single mode optical fiber. The output of the waveguide was collected by a 10× microscope objective coupled to a CCD camera. The waveguide-fiber coupling into a not-annealed sample is presented in FIG. 5. It can be seen that there is indeed light confinement in the written structures. These results also indicate that the change induced over the irradiated zone corresponds to a refractive index increment (positive Δn). It was also found that the structures written at higher energies present a better light confinement than those written at lower energies. It was further observed that better light confinement was achieved in structures when written with a higher number of scans. This confirms a higher refractive index increment over the irradiated zone for structures written at higher energies and higher number of scans.

The intensity profile at the output face of a waveguide written using 5 nJ (F=44 mJ/cm², I=6.7×10¹¹ W/cm²) and 200 scans is shown in FIG. 6. The waveguide does not produce a single mode intensity distribution at the coupling wavelength (632 nm). This is shown in the inset picture of FIG. 6, which shows the mode intensity distribution of the waveguide. It presents two bright spots which could be two propagation modes of the waveguide. Another important point to note is that the transmittance of the YSZ ceramics increases with increasing wavelengths, suggesting that the transmittance of the waveguide structures should be higher at higher wavelengths. This opens the possibility for the use of this material in telecommunications applications (e.g., 1310 and 1550 nm).

A number of embodiments have been described herein. Nevertheless, it will be understood that various modifications may be made without departing from the spirit and scope of this disclosure. Accordingly, other embodiments are within the scope of the following claims.

What is claimed is:

1. A method to write waveguide-like structures, comprising:
    providing yttria stabilized zirconia (YSZ) powder having powder grains less than 100 nm;
    processing the yttria stabilized zirconia powder using a current activated pressure assisted densification (CA-PAD) process to obtain a YSZ transparent ceramic material; and
    processing the YSZ transparent ceramic material using femtosecond laser pulses with a per-pulse energy between 1 nJ to 8 nJ.

2. The method of claim 1, wherein the YSZ transparent ceramic material is not annealed prior to processing with the femtosecond laser pulses.

3. The method of claim 1, wherein the YSZ transparent ceramic material is annealed at 750° C. in the presence of air for 1 to 15 minutes prior to processing with the femtosecond laser pulses.

* * * * *